(12) United States Patent
Clark

(10) Patent No.: US 11,982,012 B2
(45) Date of Patent: May 14, 2024

(54) METHOD OF ELECTROPOLISHING

(71) Applicant: ROLLS-ROYCE plc, London (GB)

(72) Inventor: Daniel Clark, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/842,447

(22) Filed: Jun. 16, 2022

(65) Prior Publication Data

US 2022/0411954 A1 Dec. 29, 2022

(30) Foreign Application Priority Data

Jun. 24, 2021 (GB) ..................................... 2109053

(51) Int. Cl.
| | | |
|---|---|---|
| *C25F 3/16* | (2006.01) | |
| *B22F 10/62* | (2021.01) | |
| *B33Y 10/00* | (2015.01) | |
| *B33Y 40/20* | (2020.01) | |

(52) U.S. Cl.
CPC ................ *C25F 3/16* (2013.01); *B22F 10/62* (2021.01); *B33Y 40/20* (2020.01); *B33Y 10/00* (2014.12)

(58) Field of Classification Search
CPC ...... C25F 3/16; C25F 3/20; C25F 3/24; C25F 3/26; C25F 7/00; B22F 10/62; B22F 5/009; B22F 5/04; B22F 10/00; B33Y 40/20; B33Y 10/00; B33Y 80/00; F05D 2250/621; F01D 5/005; F01D 25/002; F01D 25/285
See application file for complete search history.

(56) References Cited

U.S. PATENT DOCUMENTS

| | | |
|---|---|---|
| 4,645,581 A | 2/1987 | Voggenthaler et al. |
| 5,135,625 A | 8/1992 | Lewy |
| 6,217,726 B1 | 4/2001 | Lorincz et al. |

(Continued)

FOREIGN PATENT DOCUMENTS

| | | |
|---|---|---|
| CN | 201990756 U | 9/2011 |
| CN | 103820844 A | 5/2014 |

(Continued)

OTHER PUBLICATIONS

Dec. 6, 2022 Extended European Search Report issued in European Patent Application No. 22179398.7.

(Continued)

*Primary Examiner* — Rebecca Janssen
(74) *Attorney, Agent, or Firm* — Oliff PLC

(57) ABSTRACT

A method of electropolishing an internal passageway of a component, wherein the passageway has an inlet and an outlet; including: providing an electrode assembly including a flexible electrode, a shuttle and a guide cable extending between the flexible electrode and the shuttle; inserting the shuttle into the inlet; causing fluid to flow through the passageway to transport the shuttle through the passageway from the inlet towards the outlet; pulling the guide cable through the passageway to position the electrode in the passageway adjacent to a region of the passageway to be polished; and electropolishing the passageway using the electrode while moving the electrode within the passageway. Also, an electrode assembly for electropolishing an internal passageway of a component, including: a flexible electrode, a shuttle, and a guide cable extending between the flexible electrode and the shuttle.

12 Claims, 13 Drawing Sheets

(56) References Cited

U.S. PATENT DOCUMENTS

2018/0245227 A1*  8/2018  Abbott .................. C25D 3/665
2020/0338640 A1   10/2020  Zhang
2021/0031460 A1*  2/2021  Lobo Fenoglietto .. B33Y 10/00
2021/0292930 A1*  9/2021  Palumbo .................. C25D 3/38

FOREIGN PATENT DOCUMENTS

| CN | 110496964 A | 11/2019 |
| CN | 108570705 B | 5/2020 |
| GB | 2 551 175 A | 12/2017 |
| WO | 2021/184114 A1 | 9/2021 |

OTHER PUBLICATIONS

Nov. 19, 2021 Combined Search and Examination Report issued in British Patent Application No. 2109053.5.

* cited by examiner

METHOD OF ELECTROPOLISHING

FIELD OF THE DISCLOSURE

The present disclosure relates to a method of electropolishing an internal passageway of a component and a kit for electropolishing an internal passageway of a component.

BACKGROUND

Additive manufacturing (e.g. additive layer manufacturing, ALM) has been proposed for the manufacture of components having complex geometries, including complex internal structures or channels. However, additive manufacturing can produce a component with a rough surface requiring finishing. Rough surfaces in internal fluid flow passageways can obstruct flow and can have a detrimental effect on performance.

Internal passageways having complex geometries may not readily be finished through grinding or polishing with abrasive particles, as this can result in accumulation of abrasive particles at bends and narrow passages, or contamination of the component with abrasive particles.

There is therefore a need to develop a surface finishing method to alleviate at least some of the aforementioned problems.

SUMMARY

According to a first aspect there is provided a method of electropolishing an internal passageway of a component, wherein the passageway has an inlet and an outlet; comprising: providing an electrode assembly comprising a flexible electrode, a shuttle and a guide cable extending between the flexible electrode and the shuttle; inserting the shuttle into the inlet; causing fluid to flow through the passageway to transport the shuttle through the passageway from the inlet towards the outlet; pulling the guide cable through the passageway to position the electrode in the passageway adjacent to a region of the passageway to be polished; and electropolishing the passageway using the electrode while moving the electrode within the passageway.

Using a flexible electrode allows complex and convoluted internal passageways of a component to be electropolished. Moving the electrode within the passageway whilst electropolishing minimises electrolyte flow stagnation and allows a uniform surface finish to be achieved in the passageway.

The fluid may be an electrolyte suitable for electropolishing.

Transporting the shuttle through the passageway by the fluid flow may cause the guide cable to be pulled through the passageway to position the electrode adjacent to the region of the passageway to be polished.

The method may further comprise inserting a retainer through the outlet, and catching the shuttle with the retainer. It may be that the retainer is controllable to close around the shuttle. The guide cable may be pulled through the passageway to position the electrode by using the retainer to pull the shuttle and thereby the guide cable.

Catching the shuttle with the retainer and pulling the guide cable helps the electrode to be drawn into position in the passageway.

The method may further comprise guiding the transport of the shuttle within the passageway towards the outlet with a temporary guide located within the passageway.

The temporary guide may help to direct the transport of the shuttle so that it reaches the outlet without being impeded by any internal curvature or complex internal features of the passageway.

The method may further comprise removing the temporary guide. The temporary guide may be removed by leaching or etching.

The temporary guide can be easily removed from the passageway before the component is used.

The guide may be formed in the passageway using additive manufacturing, for example additive layer manufacturing (ALM).

The flexible electrode may comprise a plurality of electrode segments which are independently selectable for electro-polishing by a controller. The method may further comprise the controller selecting a proper subset of the electrode segments and electropolishing portions of the passageway local to the or each respective electrode segment.

It may be that the controller causes current to flow to the selected electrode segments of the plurality while preventing current to flow to the non-selected electrode segments.

This may allow only selective portions of the passageway to be electropolished and therefore provide localised surface finishing An electrolyte may be received in the passageway for electropolishing. The electrolyte may comprise a deep eutectic solvent.

According to a second aspect there is provided a kit for electropolishing an internal passageway of a component, comprising: a flexible electrode, a shuttle, and a guide cable extending between the flexible electrode and the shuttle.

The electrode may comprise a plurality of electrode segments. Each of the plurality of segments may be configured to be independently selectable for electropolishing. The kit may further comprise a controller configured to independently select a proper subset of the electrode segments for electropolishing. It may be that the controller is configured to cause current to flow to the selected electrode segments of the plurality while preventing current to flow to the non-selected electrode segments.

Each segment of the flexible electrode may comprise an electrically conductive core covered by an insulating jacket. The jacket may have at least one window exposing the core.

According to a third aspect there is provided a method comprising manufacturing a component by additive manufacture to form: a body defining an inlet, an outlet, and an internal passageway for flow between the inlet and the outlet; and a temporary guide disposed within the internal passageway, wherein the temporary guide is configured to guide transport of a shuttle suspended in a fluid flow from the inlet and the outlet so that the shuttle moves towards the outlet; wherein the temporary guide and the body are formed from different materials, such that the temporary guide is removable by leaching or etching while the body remains intact.

The temporary guide may be configured to at least partially block a portion of the internal passageway so as to direct fluid flow and/or the shuttle towards the outlet.

The method may further comprise electropolishing the internal passageway in accordance with any the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds), for example in the range of from 80 Nkg-1s to 100 Nkg-1s, or 85 Nkg-1s to 95 Nkg-1s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
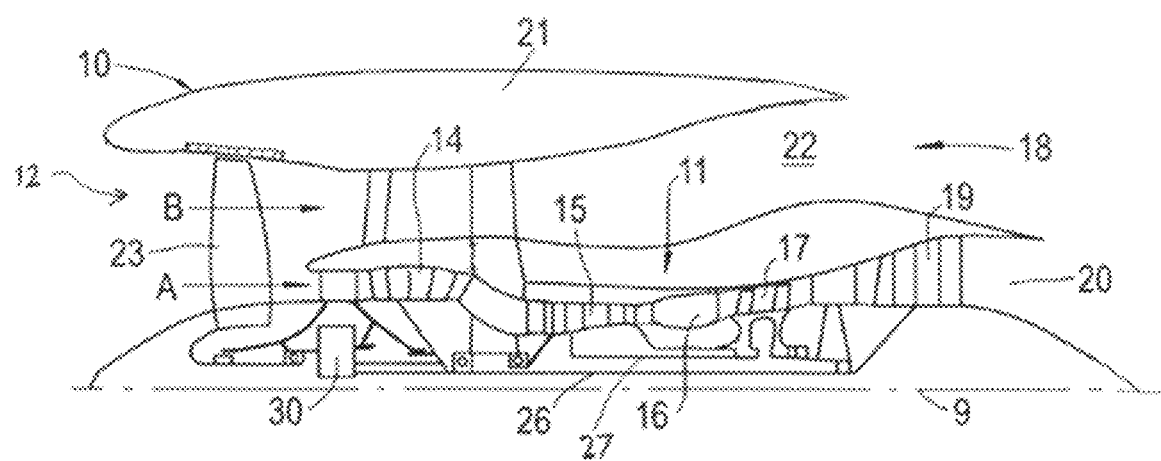
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
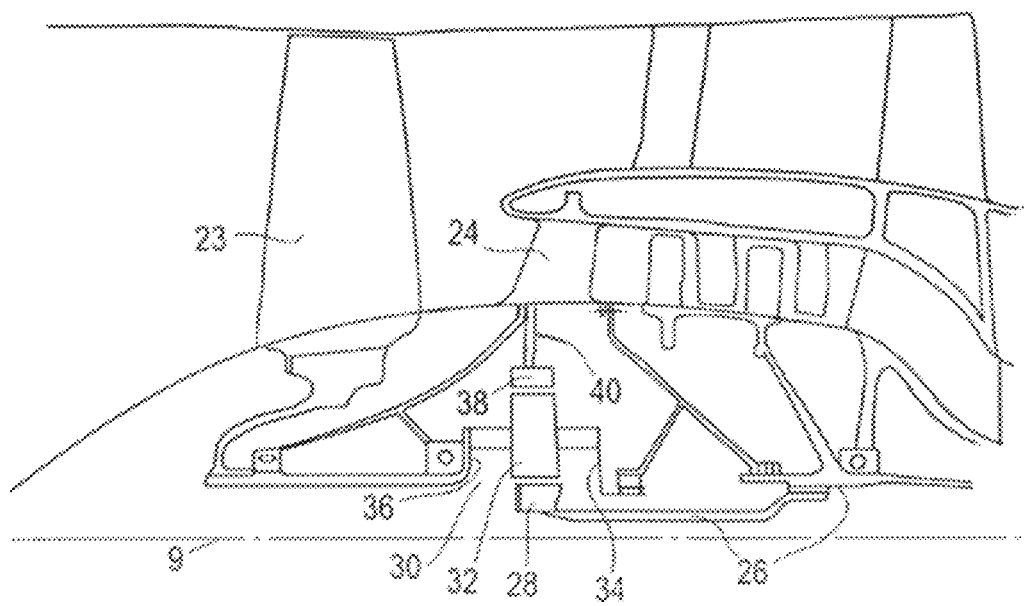
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
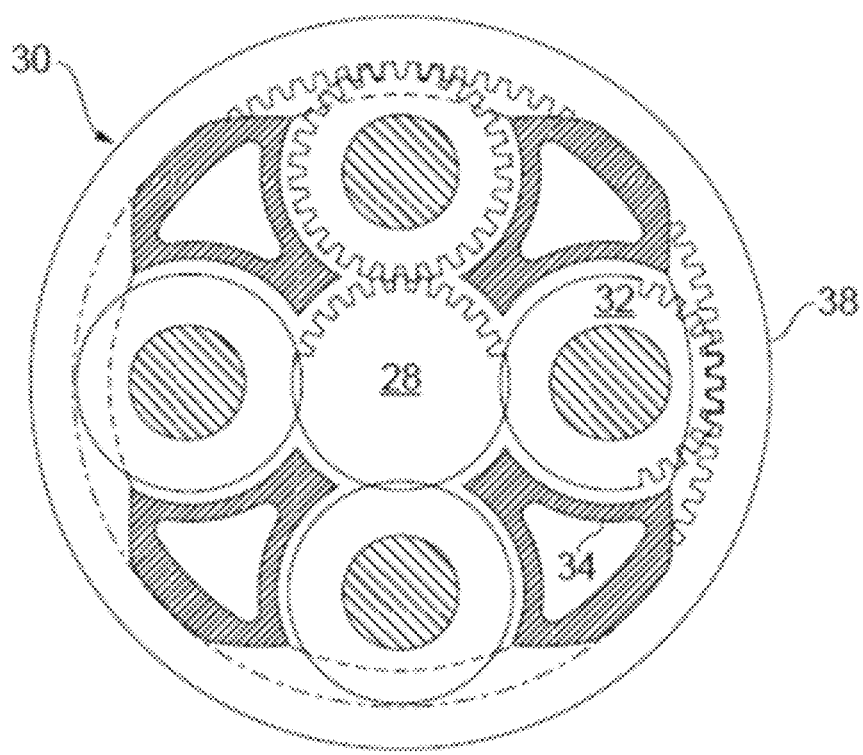
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Some components in a gas turbine engine may include complex internal passageways with bends and narrow sections, such as pipes for conveying fuel from one location to another. Such components may be manufactured by a number of manufacturing techniques, and some of those techniques may result in rough surfaces that may be surface finished to improve performance and/or geometric compliance. For example, such components may be manufactured by additive manufacturing methods including additive layer manufacturing (ALM). It may be advantageous to smooth the surface of such internal passageways. For example, in the case of a fuel injector nozzle, the internal surfaces may advantageously be smoothed to ensure that fuel can be efficiently and reliably conveyed to the required location.

Electropolishing is an electrochemical process which removes material from the surface of a metal object to improve its surface finish. In a typical electropolishing process, the metal object is immersed in a bath of electrolyte and the object is connected to a positive terminal of a DC power supply, making it the anode. An electrode is also immersed in a bath of electrolyte and is connected to the negative terminal of the DC power supply, making it the cathode. An electrical current passes from the anode to the cathode, oxidising and removing material from the surface of the object.

Figure 4:
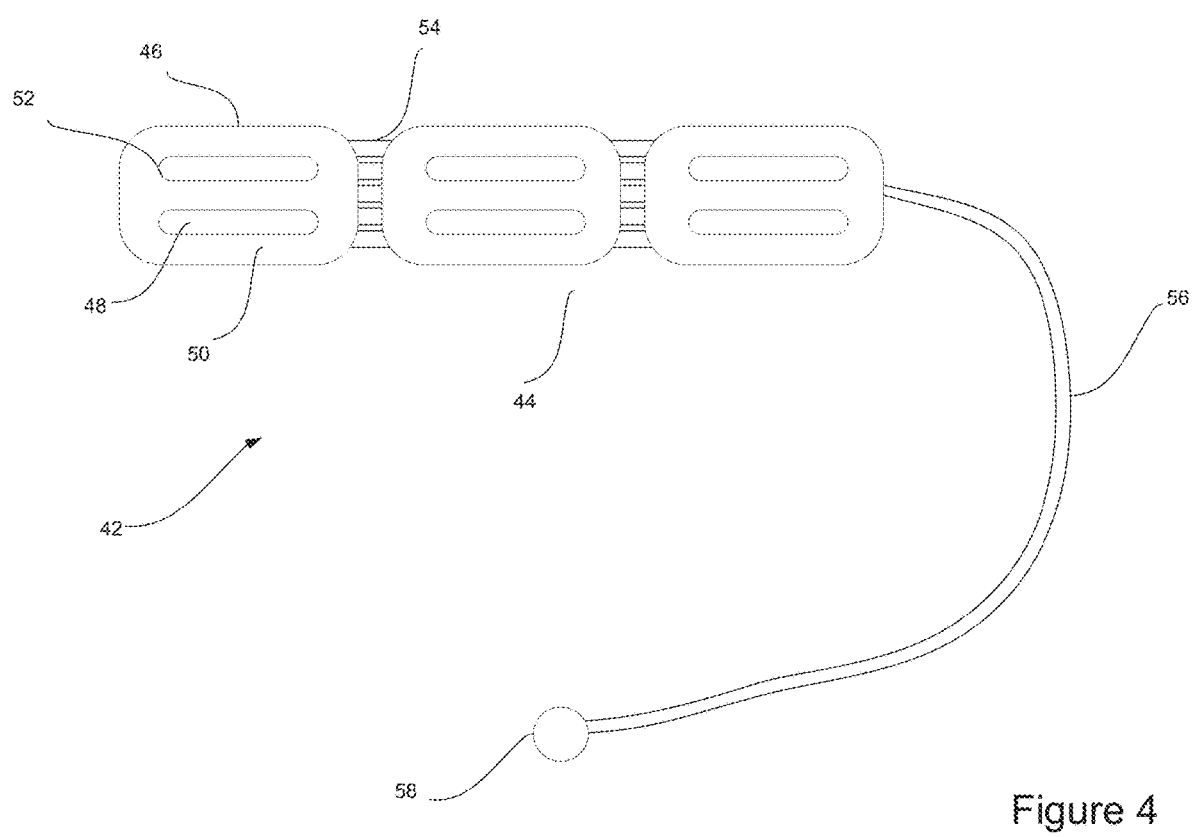
FIG. 4 shows an example electrode assembly.
Figure 5:
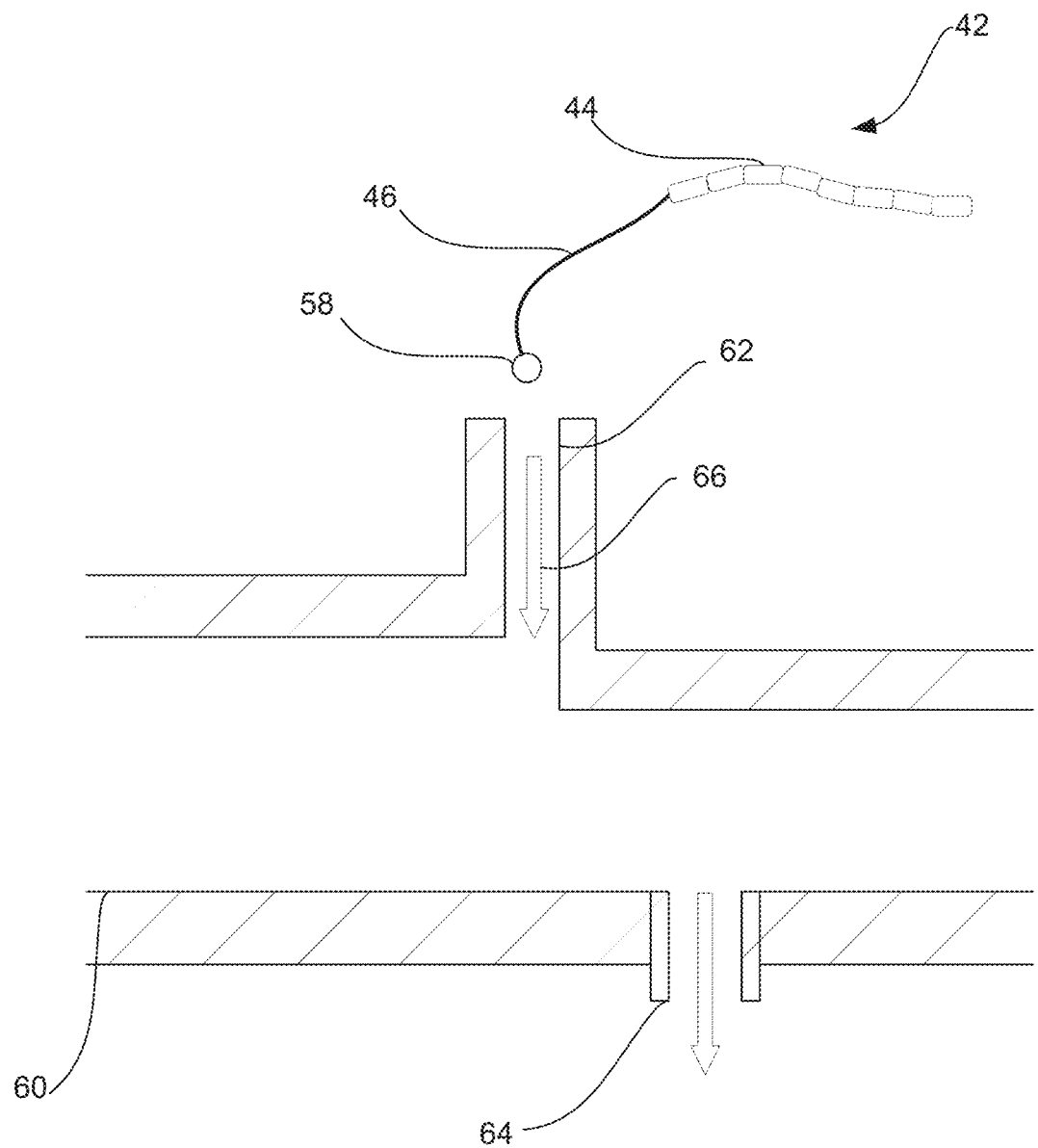
FIG. 5 is a cross-section of an example passageway of a component.

FIG. 4 shows an example electrode assembly 42 for electropolishing an internal passageway of a component (such as a passageway 60 as first shown in FIG. 5).

The electrode assembly 42 comprises a flexible electrode 44, a shuttle (or head piece) 58 and a guide cable 56 extending between the electrode 44 and the shuttle 58. The electrode 44 comprises a plurality of electrode 44 segments 46. Each segment 46 has a central core 48 formed from an electrical conductor, which may be a multi-strand electrical wire. The central core 48 is covered by an insulating jacket 50. The insulating jacket 50 is formed from an insulating material which is flexible and/or resilient. The insulating jacket 50 has at least one window 52 exposing the core 48 within, such that in use an electrolyte may flow through the jacket to the core. Each segment 46 is connected to the adjacent segment 46 with a flexible electrical conductor 54, which may be multi-strand electrical wire. This enables each segment 46 of the electrode 44 to move relative to adjacent segments 46 (e.g. by relative pivoting and rotational movement) and therefore allows the electrode 44 to be flexible.

In this example, each segment 46 has two windows 52 in the insulating jacket 50. The effective conductive area of a segment 46 may differ between segments. For example, one or more of the segments 46 in the electrode 44 may have a relatively greater effective conductive area by having a larger window 52, and/or by having a relatively greater number of windows 52 to expose a relatively larger area of the core 48.

Each segment 46 of the electrode 44 is configured to be energised independently. For example, the electrode 44 may be configured so that when coupled to a controller, the controller can select which segments 46 to energise (i.e. by providing current to those segments) and which segments 46 to leave inactive (i.e. by preventing current to those segments). Therefore the electrode 44 can be partially energised at selected points along its length by energising only selected segments 46, or fully energised such that all segments 46 of the electrode 44 are energised.

The thickness of the insulating jacket 50 may be varied according to the size and shape of the passageway 60 to be polished and the level of polishing required on the surface of the passageway 60. For example, the thickness of the insulating jacket 50 may be relatively high for some segments 46 of the electrode 44, corresponding to regions of the passageway 60 which require a low degree of polishing; whereas other segments 46 of the electrode 44 may have a relatively lower insulating jacket 50 thickness, corresponding to regions of the passageway 60 which require a high degree of polishing.

A first end of the guide cable 56 is attached to an end of the electrode 44. In other examples, the guide cable 56 may be attached at other points along the length of the electrode 44, provided that the guide cable 56 extends from the electrode 44 to the shuttle 58. The shuttle 58 is attached at a second, opposite end of the guide cable 56. The shuttle 58 may be sized and shaped to pass through the passageway of the component. The shuttle 58 may be configured to be easily entrained within a fluid flow for transport, for example by being configured to be of comparable density to the fluid flow. The shuttle may be hollow. In this example, the shuttle 58 has a rounded shape to allow it to pass through the passageway 60 without being caught or obstructed by any internal corners or features present in the passageway 60. It will be appreciated that the shape of the shuttle 58 may be adapted to suit the size, shape and features within the particular passageway 60.

FIG. 5 shows a cross-section of an example internal passageway 60 of a component to be polished, and methods of positioning the example electrode 44 and electropolishing will now be described with reference to the example component.

For the purpose of illustration, the passageway 60 is shown as having a relatively simple profile. It will be appreciated that passageways 60 may be more complex than the profile shown.

The passageway 60 has an inlet 62 and an outlet 64. Initially a fluid flow 66 is established through the passageway 60. The fluid flows in a direction from the inlet 62 to the outlet 64. The fluid may be an electrolyte suitable for electropolishing; however any suitable fluid may be used, such as water.

Figure 6A:
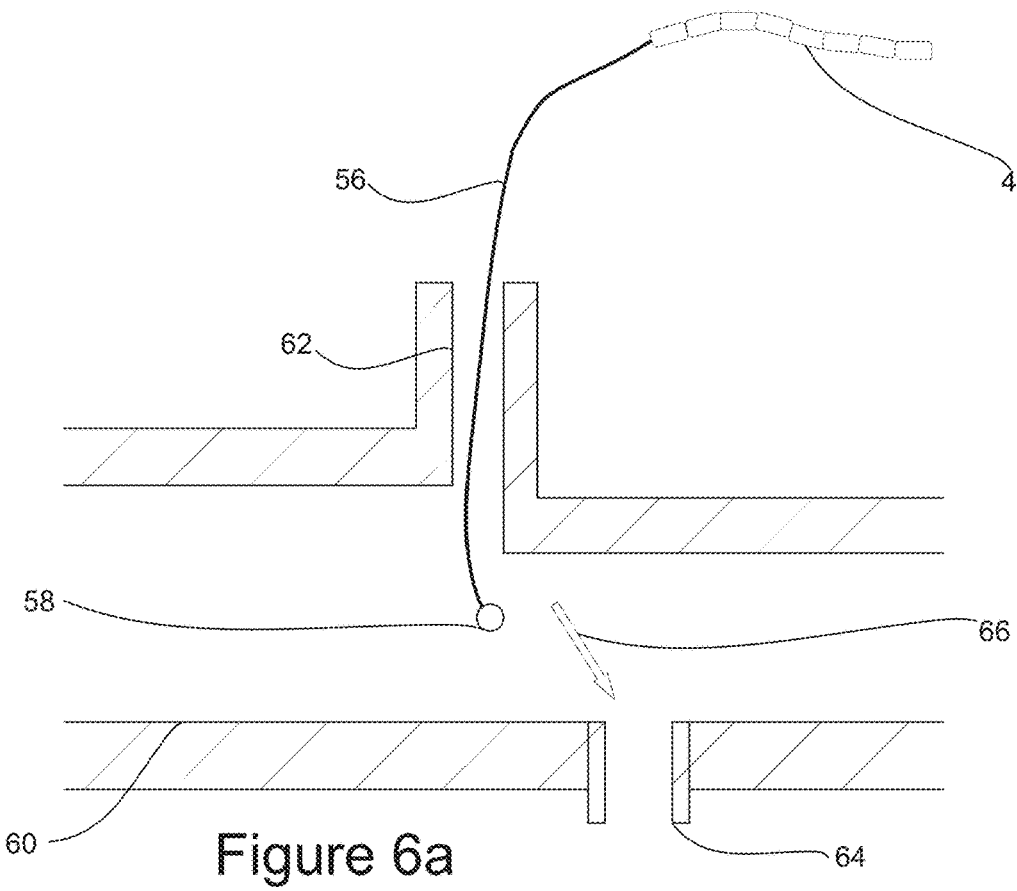
FIGS. 6a and 6b are cross-sections of an example passageway of a component showing the transport of a shuttle.
Figure 6B:
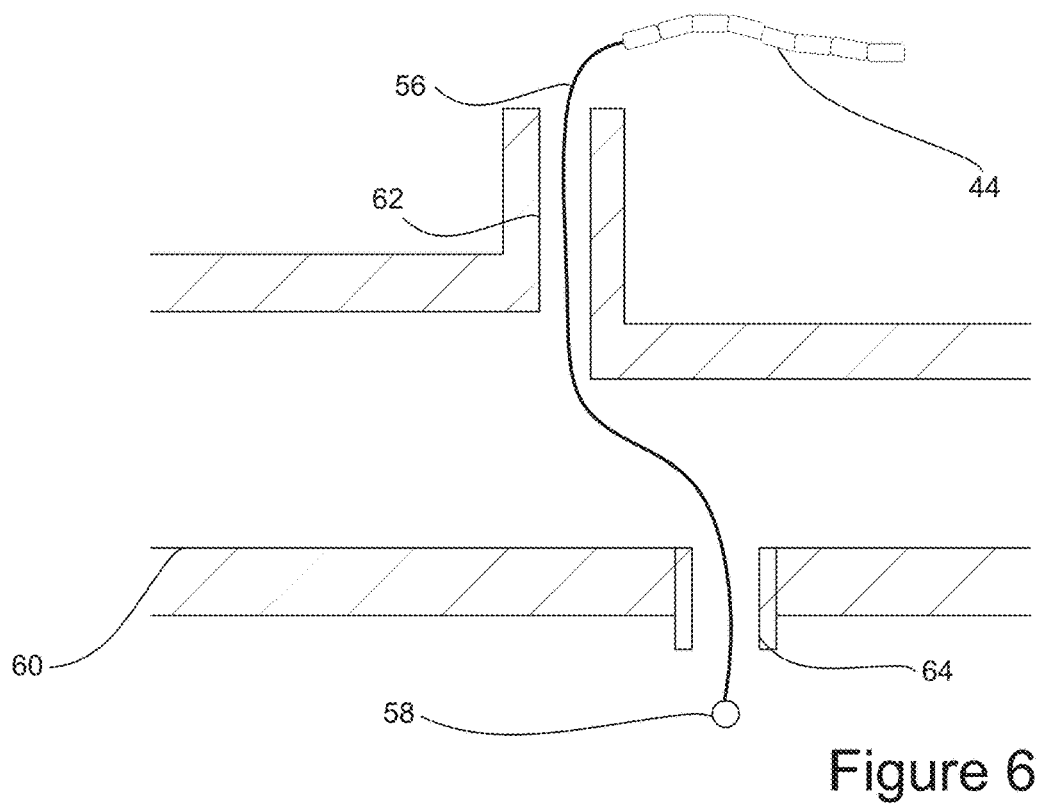

The shuttle 58 of the electrode assembly 42 is to be inserted into the passageway 60 through the inlet 62, as shown in FIG. 6a. The direction of the fluid flow 66 causes the shuttle 58 to be transported through the passageway 60 from the inlet 62 towards the outlet 64, as shown in FIG. 6b. The shuttle 58 is entrained in the fluid flow 66. The flow rate of the fluid flow 66 may be controlled to enable the shuttle 58 to reach the outlet 64. For example, a flow rate which is too low may fail to entrain the shuttle 58. As the shuttle 58 moves towards the outlet 64, the guide cable 56 is consequently drawn into the passageway 60. In this example, the shuttle 58 exits the passageway 60 by passing through the outlet 64 under the action of the fluid flow 66.

Figure 7:
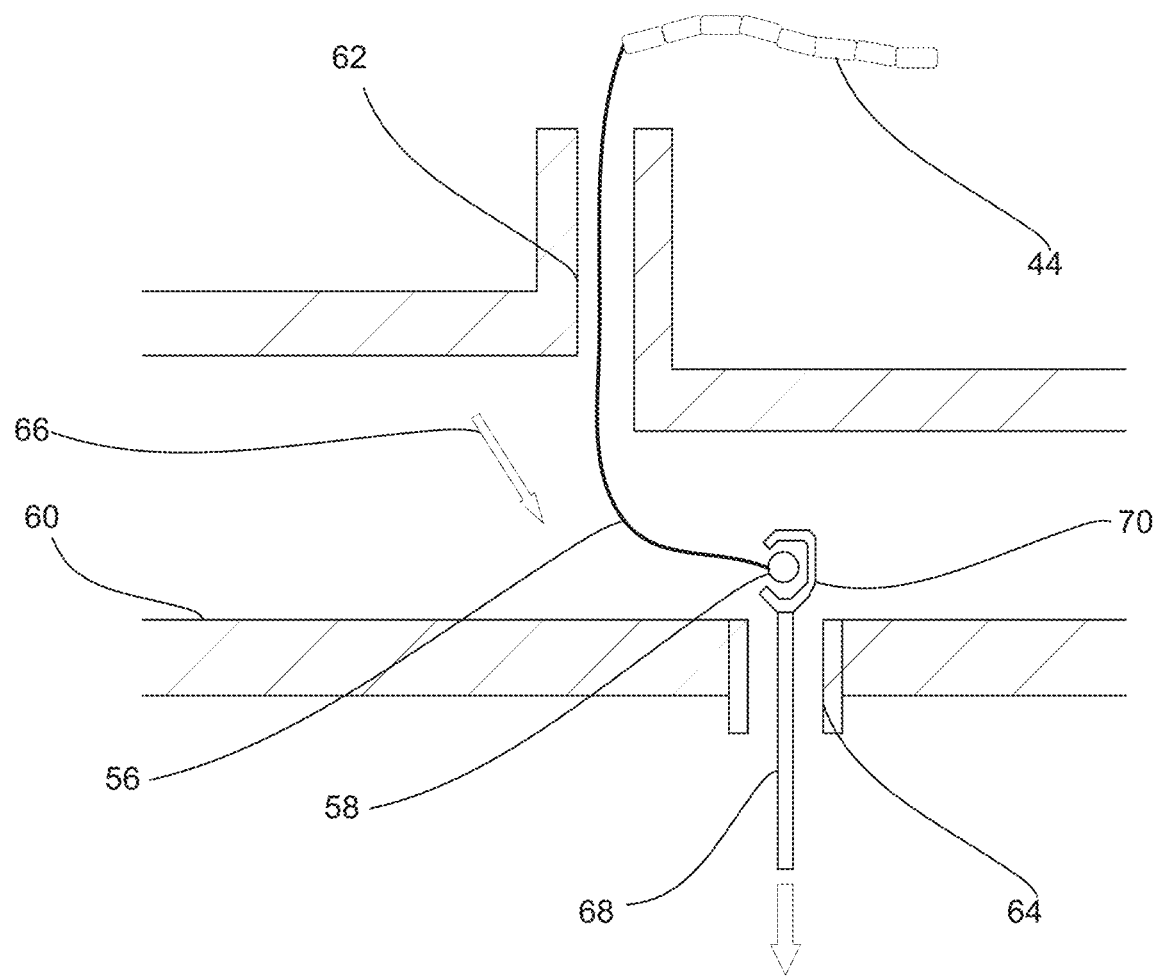
FIG. 7 is a cross-section of an example passageway of a component showing an example retainer.

FIG. 7 shows another example of how the shuttle 58 can reach the outlet 64 of the passageway 60. As described in relation to the previous example, a fluid flow 66 is established through the passageway 60 in a direction from the inlet 62 to the outlet 64. The shuttle 58 is inserted into the inlet 62 of the passageway 60 and the direction of the fluid flow 66 causes the shuttle 58 to be entrained in the fluid flow 66 and transported through the passageway 60 and towards the outlet 64.

A retainer 68 is inserted into the passageway 60 from the outlet 64. In this example, the retainer 68 comprises an arm having a retention feature 70 at an end of the arm. The retention feature 70 is configured to catch the shuttle 58 as it passes through the passageway 60 towards the outlet 64. The retention feature 70 may be a passive structure which allows the shuttle 58 to enter the retention feature 70 and prevents the shuttle 58 from leaving the retention feature 70, such as a narrowing conical tube. Alternatively, the retention feature 70 may comprise a mechanism which can be actuated to close around and capture the shuttle 58 as it moves towards the outlet 64 of the passageway 60. In another example, both the shuttle 58 and the retention feature 70 may have cooperating magnets, such that the shuttle 58 is drawn towards the retention feature 70 as it passes through the passageway 60.

The retainer 68 may be perforated to allow fluid to pass through the retainer 68, so as to minimise detrimental flow effects on the fluid flow 66 as a result of the presence of the retainer 68 in the passageway 60.

Once the shuttle 58 has been caught by the retainer 68, the retainer 68 is withdrawn from the outlet 64 to pull the shuttle 58 out of the passageway 60 and thereby draw the guide cable 56 through the passageway 60. The retainer 68 may be automatically controlled and actuated, for example by a robotic arm.

Figure 8:
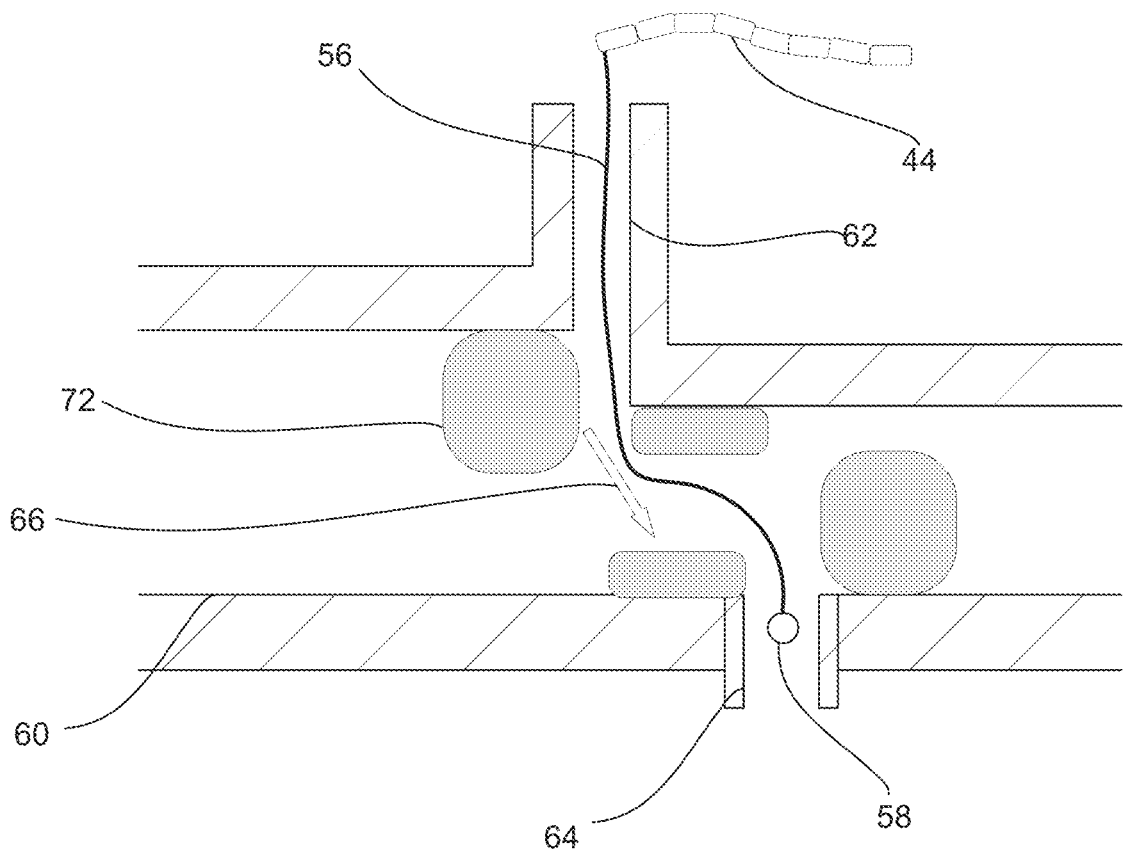
FIG. 8 is a cross section of an example passageway of a component showing guides.

FIG. 8 shows another example of how the shuttle 58 can reach the outlet 64 of the passageway 60. In addition to the features described with reference to FIGS. 6a and 6b, the passageway 60 comprises temporary guides 72. The temporary guides 72 could be added to the passageway 60 during the manufacture of the component. For example, the temporary guides 72 could be produced in the same ALM process but using a different material to that of the body of the component (i.e. the part of the article manufactured by ALM which corresponds to the finished component). The temporary guides 72 could also be added to the passageway 60 in a secondary manufacturing operation after the component has been produced, for example in a subsequent ALM process or by affixing them in the passageway 60 with an adhesive. While this example includes multiple temporary guides 72, there could also be a single such temporary guide 72.

The temporary guides 72 are positioned in the passageway 60 to guide the transport of the shuttle 58 through the passageway 60 by the fluid flow 66. As the fluid flow 66 carries the shuttle 58 from the inlet 62 to the outlet 64, the guides 72 act to direct the shuttle 58 towards the outlet 64 by restricting the region of the passageway 60 in which the fluid flow 66 and thereby the shuttle 58 is able to travel. The guides 72 may block off particular areas of the passageway 60 to prevent the shuttle 58 from travelling past the outlet 64. The guides may do so by providing a physical obstruction to a portion of the passageway 60 and/or by redirecting the flow so that an entrained shuttle 58 would not pass to that portion of the passageway 60. The guides 72 may provide rounding on corners within the passageway 60 to prevent the shuttle 58 and/or guide cable 56 from becoming stuck.

Once the shuttle 58 has been transported to the outlet 64 (whether using a retainer or not), the guides 72 may be removed from the passageway 60. For example, the temporary guides 72 may be removed by leaching, etching or dissolution by the fluid or by the electrolyte.

Figure 9A:
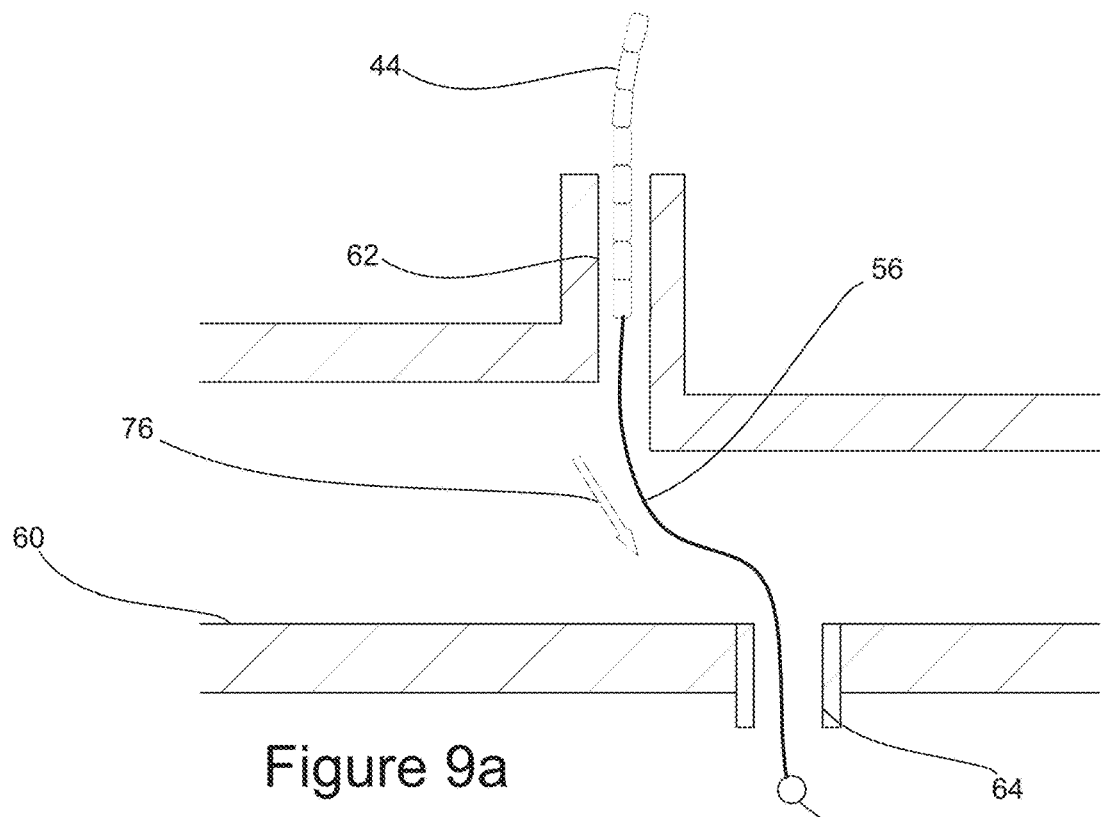
FIGS. 9a and 9b are cross-sections of an example passageway of a component showing positioning of an electrode within the passageway.
Figure 9B:
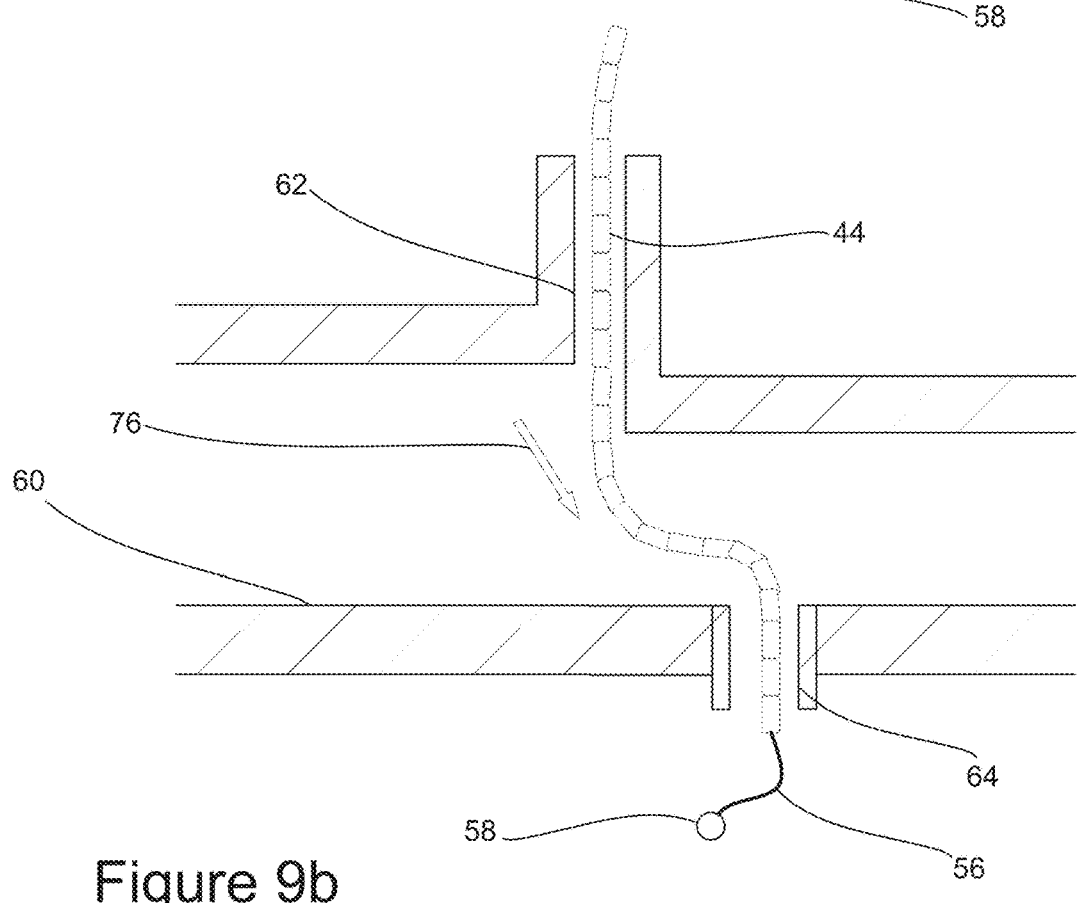

FIGS. 9a and 9b show how the electrode 44 is drawn into the passageway 60. As described previously, the transport of the shuttle 58 through the passageway 60 to the outlet 64 causes the guide cable 56 to be drawn into the passageway 60. The electrode 44 is attached to the guide cable 56, and so as the guide cable 56 is drawn through the passageway the electrode 44 may also drawn into the passageway.

Whether or not the electrode is partially or wholly drawn into the passageway 60 by virtue of transporting the shuttle 58 through the passageway, there may be a separate step of positioning the electrode 44 within the passageway for electropolishing. In this step, the guide cable 56 is pulled through the passageway 60 and as a result, the electrode 44 is drawn into the passageway 60, as shown in FIG. 9a. The inlet 62 may be fluted or be provided with a funnel (e.g. a nozzle) to aid insertion of the electrode 44 into the passageway 60.

The guide cable 56 is pulled through the passageway 60 until the electrode 44 has been positioned adjacent to a region of the passageway 60 to be electropolished, as illustrated in FIG. 9b. For example, the position of the electrode 44 may be adjusted to ensure that the electrode 44 lies along a path corresponding to the curvature of the passageway 60. If the electrode 44 is drawing too far, it may be pulled back using a portion extending out of the inlet 62 (or a trailing guide cable, for example).

If the fluid used for originally transporting the shuttle 58 to the outlet 64 is not an electrolyte suitable for electropolishing, the fluid flow through the passageway 60 is terminated and a flow of suitable electrolyte 76 is established through the passageway 60 ready for electropolishing. This replacement (i.e. replacing the original fluid with an electrolyte) may take place at any time prior to commencing electropolishing. For example, the electrolyte flow may be established after the shuttle is retained at the outlet 64 and before final placement of the electrode 44 for electropolishing, or the electrolyte flow may be established after final placement of the electrode 44 for electropolishing. The electrolyte 76 flows in a direction from the inlet 62 to the outlet 64 of the passageway 60. The electrolyte may be any electrolyte that is suitable for electropolishing. In an example, the electrolyte may be a Deep Eutectic Solvent.

Once the electrode 44 is in position for electropolishing, the electrode 44 is connected to the negative terminal of a DC power supply, whilst the component is connected to the positive terminal, thus making the component to be the anode, and the electrode 44 to be the cathode. The electrode 44 is activated such that an electric current passes from the component to the electrode 44 and electropolishing of the passageway 60 commences. The material on the surface of the passageway 60 is dissolved into the electrolyte. The flow of the electrolyte 76 carries the dissolved material out of the passageway 60 through the outlet 64.

Whilst electropolishing, the electrode 44 is moved within the passageway 60. Moving the electrode 44 whilst electropolishing ensures that the regions of the passageway 60 to be polished are uniformly polished. Additionally, moving the electrode 44 reduces the occurrence of electrolyte flow stagnation in regions of the passageway 60. Electrolyte flow stagnation can occur when using a static electrode 44 in convoluted passageway 60s and can lead to certain regions of the passageway 60 being polished to a greater or lesser extent than required. By moving the electrode 44, the electrolyte can flow freely through the passageway 60 and uniform polishing of the surface can be achieved. The electrode 44 may be moved by pulling the electrode 44 in different directions, which may be done manually or actuated robotically. The electrode 44 may also be moved by the electrolyte flow 76 by controlling the speed and/or direction of the electrolyte flow through the passageway 60.

Electropolishing of a given region of the passageway 60 may continue until the potential difference between the electrode 44 and the given region reaches a target value corresponding to a target level of surface finishing required.

As described previously, each segment 46 of the electrode 44 is independently selectable for electropolishing. Each segment 46 may be selectively energised to achieve local polishing of selected regions of the passageway 60. For example, if a greater degree of surface finishing is required in a particular region of the passageway 60, only the segments 46 adjacent to that region may be energised and other segments 46 may not be energised. The degree of surface finishing of a particular region of the passageway 60 can also be varied by varying the time spent for electropolishing that region. The intensity of the electropolishing of a particular region may be also be varied by changing the size or number of windows 52 in the insulating jacket 50 of the segments 46 to expose a larger or smaller area of the core 48.

Figure 11:
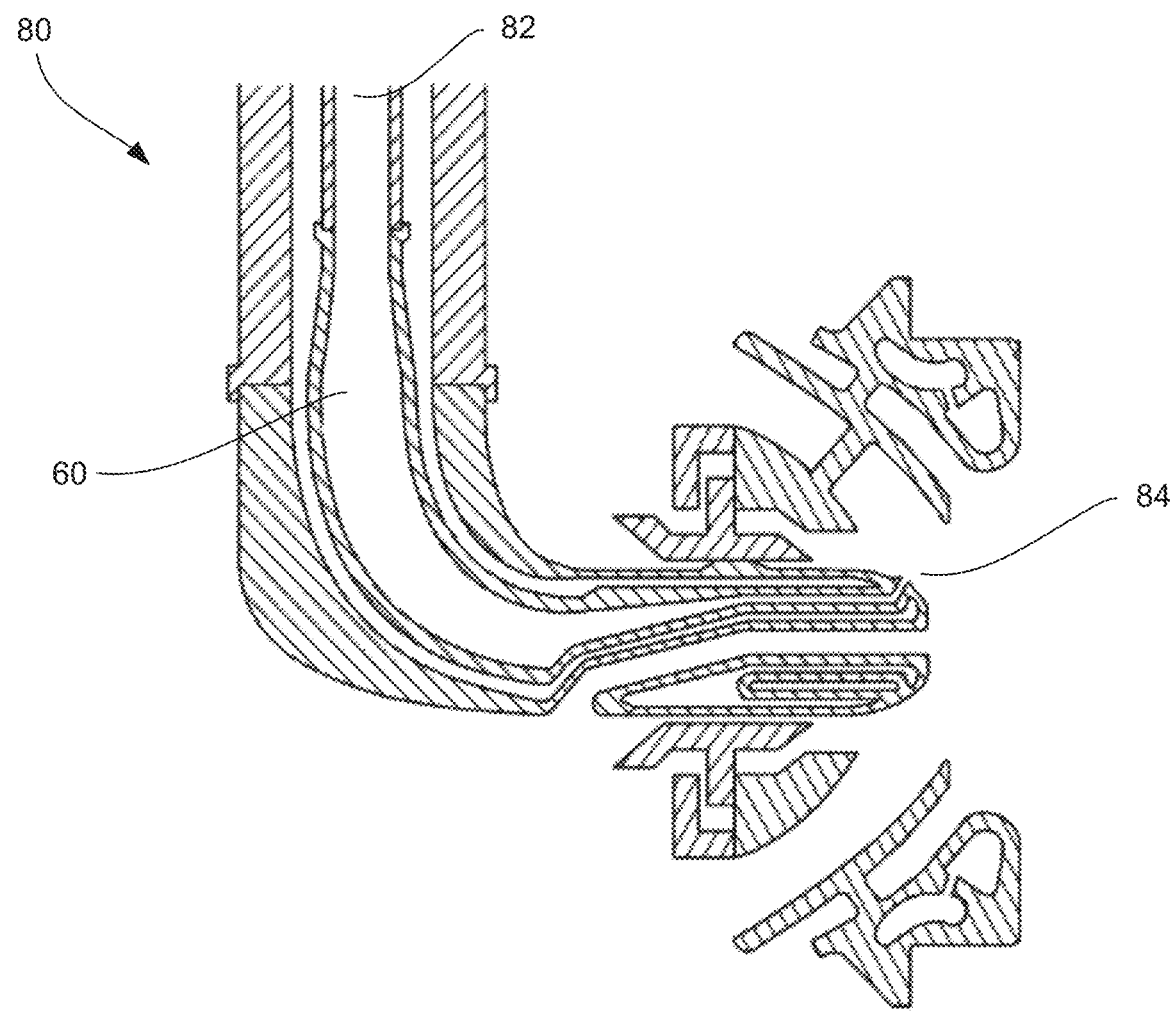
FIG. 11 is a cross-section of an example fuel injection nozzle having an example passageway.

FIG. 11 shows an example fuel injection nozzle 80 for use in a gas turbine engine. The fuel injection nozzle 80 comprises an internal passageway 60 extending between a fuel inlet 82 and a fuel outlet 84. The passageway 60 has convoluted geometry, having variable curvature and variable cross-section along its length from the fuel inlet 82 and the fuel outlet 84. The passageway 60 of the fuel injection nozzle 80 is an example of an internal passageway that can be electropolished using the aforementioned method. Other examples to which the disclosure applies include an internal passageway of a heat exchanger.

Figure 10:
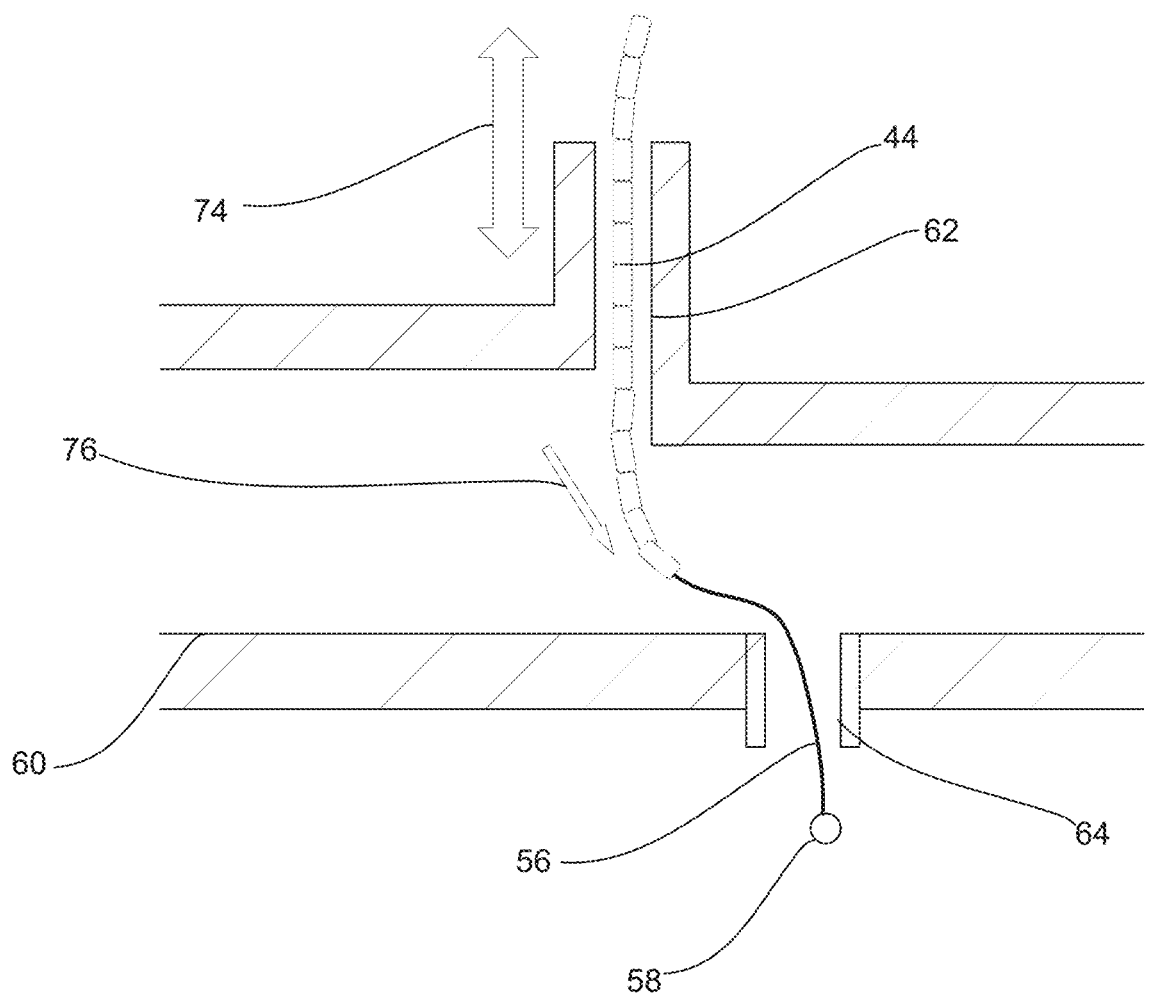
FIG. 10 is a cross-section of an example passageway of a component showing movement of the electrode within the passageway.
Figure 12:
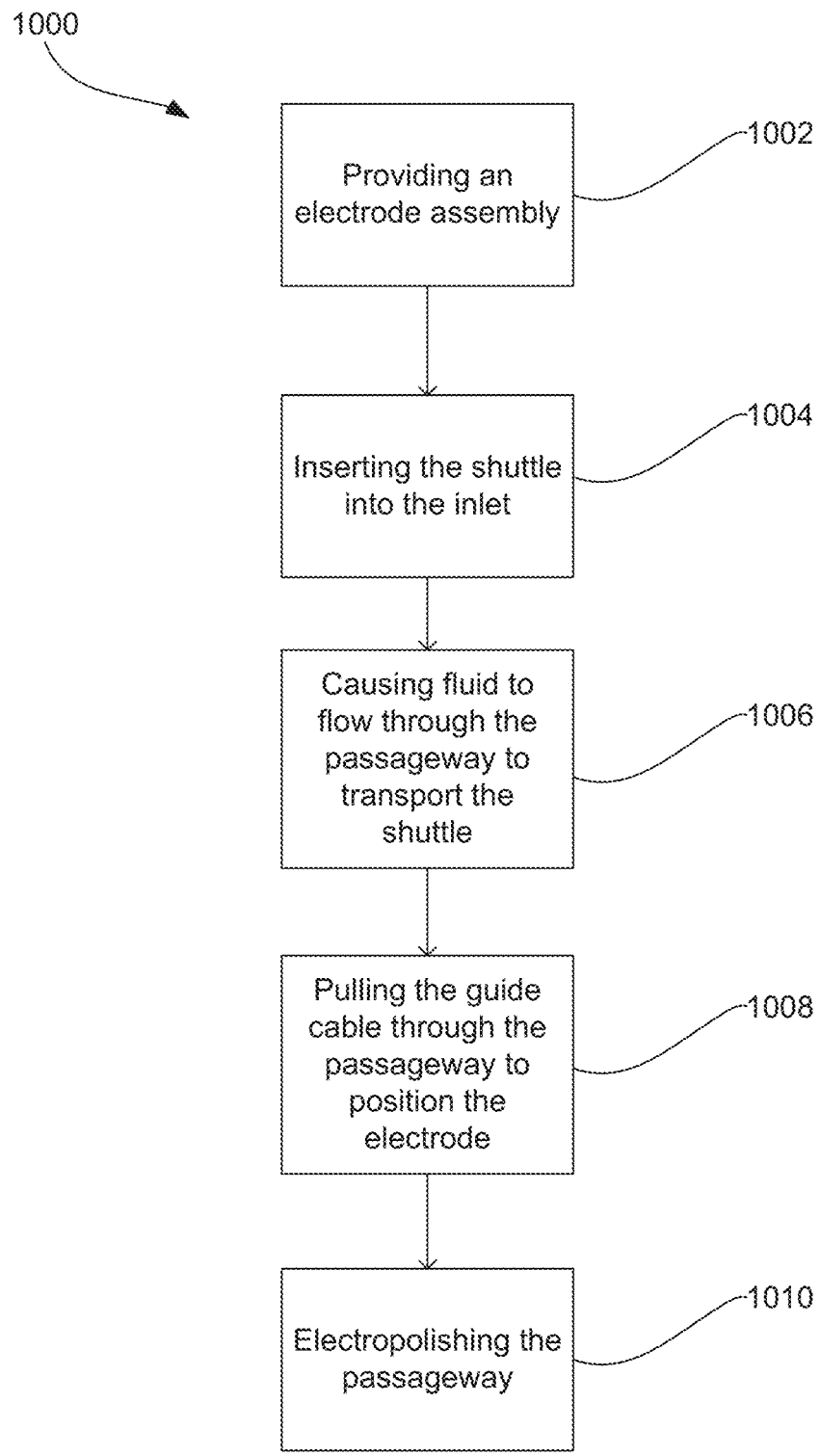
FIG. 12 is a flowchart showing the method of electropolishing the component with reference to FIGS. 6a, 6b and 10.

A method 1000 of electropolishing an internal passageway 60 of a component will now be described with reference to FIG. 12, with further reference to FIGS. 6a, 6b and 10. In block 1002, an electrode assembly 42 comprising a flexible electrode 44, a shuttle 58 and a guide cable 56 extending between the flexible electrode 44 and the shuttle 58 is provided. At block 1004, the shuttle 58 is inserted into the inlet 62 of the passageway 60. In block 1006, fluid is caused to flow through the passageway 60 to transport the shuttle 58 through the passageway 60 from the inlet 62 towards the outlet 64. At block 1008, the guide cable 56 is pulled through the passageway 60 to position the electrode 44 in the passageway 60 adjacent to a region of the passageway 60 to be polished. At block 1010, the passageway 60 is electropolished using the electrode 44 while moving the electrode 44 within the passageway 60.

Figure 13:
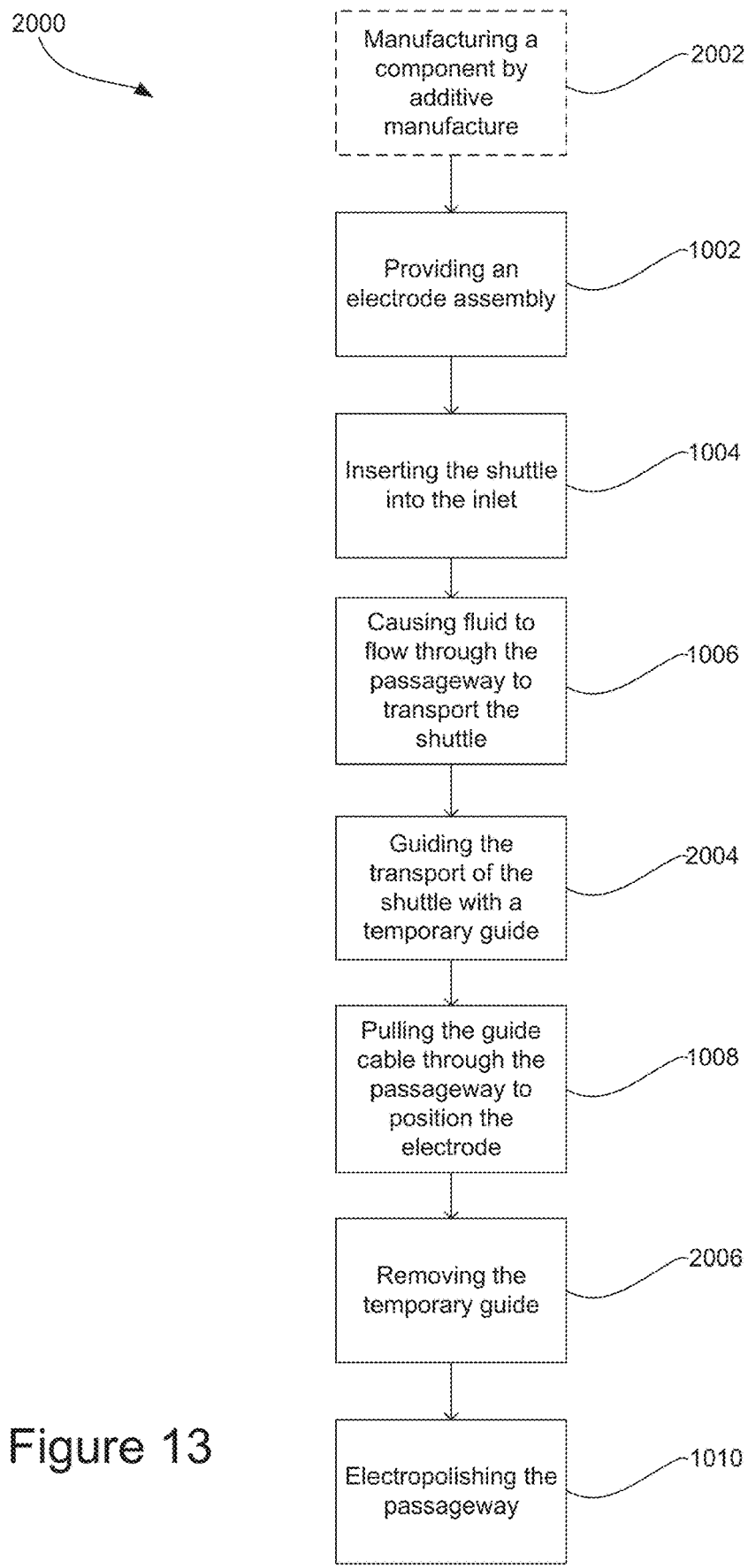
FIG. 13 is a flowchart showing the method of electropolishing the component with reference to FIGS. 6a, 6b, 8 and 10.

An alternative method 2000 of electropolishing an internal passageway 60 of a component will be described with reference to FIG. 13 and with further reference to FIGS. 6a, 6b, 8 and 10. Reference is made to the method 1000 described in FIG. 12, with like reference numerals indicating like features. In block 2002, a component is manufactured by additive manufacture to form: a body defining an inlet 62, an outlet 64, and an internal passageway 60 for flow between the inlet 62 and outlet 64; and a temporary guide 72 disposed within the internal passageway 60. In block 1002, an electrode assembly 42 comprising a flexible electrode 44, a shuttle 58 and a guide cable 56 extending between the flexible electrode 44 and the shuttle 58 is provided. At block 1004, the shuttle 58 is inserted into the inlet 62 of the passageway 60. In block 1006, fluid is caused to flow through the passageway 60 to transport the shuttle 58 through the passageway 60 from the inlet 62 towards the outlet 64. At block 2004, the transport of the shuttle 58 within the passageway 60 is guided towards the outlet 64 with a temporary guide 72 located within the passageway. At block 1008, the guide cable 56 is pulled through the passageway 60 to position the electrode 44 in the passageway 60 adjacent to a region of the passageway 60 to be polished. At block 2006, the temporary guide 72 is removed. The temporary guide 72 may be removed by leaching or etching. At block 1010, the passageway 60 is electropolished using the electrode 44 while moving the electrode 44 within the passageway 60.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of electropolishing an internal passageway of a component, wherein the passageway has an inlet and an outlet; comprising:
providing an electrode assembly comprising a flexible electrode; a head piece and a guide cable extending between the flexible electrode and the head piece;
inserting the head piece into the inlet;
causing fluid to flow through the passageway and entraining the head piece in the fluid to transport the head piece through the passageway from the inlet towards the outlet;
pulling the guide cable through the passageway to position the electrode in the passageway adjacent to a region of the passageway to be polished; and
electropolishing the passageway using the electrode while moving the electrode within the passageway.

2. A method according to claim 1, wherein transporting the head piece through the passageway by the fluid flow causes the guide cable to be pulled through the passageway to position the electrode adjacent to the region of the passageway to be polished.

3. A method according to claim 1, further comprising inserting a retainer through the outlet, and catching the head piece with the retainer.

4. A method according to claim 3, wherein the retainer is controllable to close around the head piece.

5. A method according to claim 3, wherein the guide cable is pulled through the passageway to position the electrode by using the retainer to pull the head piece and thereby the guide cable.

6. A method according to claim 1, wherein the method further comprises guiding the transport of the head piece within the passageway towards the outlet with a temporary guide located within the passageway.

7. A method according to claim 6, further comprising removing the temporary guide.

8. A method according to claim 7, wherein the temporary guide is removed by leaching or etching.

9. A method according to claim 6, wherein the guide is formed in the passageway by additive manufacturing.

10. A method according to claim 1, wherein the flexible electrode comprises a plurality of electrode segments which are independently selectable for electro-polishing by a controller, the method further comprising the controller selecting a proper subset of the electrode segments and electropolishing portions of the passageway local to the or each respective electrode segment.

11. A method according to claim 1, wherein an electrolyte is received in the passageway for electropolishing, and wherein the electrolyte comprises a deep eutectic solvent.

12. A method according to claim 1, wherein the component is a component of a gas turbine engine; optionally wherein the component is one of:
 a fuel injector nozzle;
 a stator vane such as a nozzle guide vane;
 a rotor blade such as a compressor blade or a turbine blade;
 a heat exchange element for a heat exchanger.

* * * * *